358-74. OR 3,604,844 SR

X 6475

United States Patent

[11] 3,604,844

[72] Inventor John D. Ross
Dollard des Ormeaux, Quebec, Canada

[21] Appl. No. 828,538
[22] Filed May 28, 1969
[45] Patented Sept. 14, 1971
[73] Assignee Central Dynamics, Ltd.
Pointe Claire, Montreal, Quebec, Canada

[54] VIDEO SIGNAL PROCESSING AMPLIFIER WITH AUTOMATIC GAIN CONTROL

11 Claims, 2 Drawing Figs.

[52] U.S. Cl. .......... 178/5.4 AC
[51] Int. Cl. .......... H04n 9/48
[50] Field of Search .......... 178/5.4 AC, 5.4 TE

[56] References Cited

UNITED STATES PATENTS 2,798,900 6/1957 Bradley .......... 178/5.4 AC

FOREIGN PATENTS 1,197,498 7/1965 Germany .......... 178/5.4

*Primary Examiner*—Robert L. Griffin
*Assistant Examiner*—George G. Stellar
*Attorney*—Addams & Ferguson

ABSTRACT: Automatic gain control circuitry is disclosed for maintaining the chrominance and luminance levels of a composite color television signal at a constant value. First and second test signals are respectively inserted in the 17th and 18th lines of the vertical blanking interval of each television field. The first test signal is typically a 100 IRE unit white pulse while the second is a high frequency burst signal, the frequency of which may correspond to that of the color burst. In order to maintain the level of the chrominance component of the composite color signal at a constant value, the composite color signal is applied to a signal amplifying channel where the chrominance component is extracted and the amplitude thereof is adjusted by a DC control signal which is derived as follows: The composite color signal is also applied to a pulse generator which produces a first sampling pulse during the 18th line of the vertical blanking interval so as to coincide with the approximate center of the second test signal, this sampling pulse being applied to a first sample and hold circuit. After the chrominance level has been adjusted, the adjusted composite color signal is also applied to the first sample and hold circuit. In particular, the high frequency burst test signal is filtered and rectified and the center portion thereof is sampled by the above-mentioned first sampling pulse to thereby derive the above-mentioned DC control pulse for adjusting the level of the chrominance component. The first test signal has its level sampled by a second sampling pulse generated by the pulse generator to thereby derive a second DC control signal which controls the level of the entire composite color television signal.

PATENTED SEP 14 1971 3,604,844

INVENTOR
JOHN D. ROSS

BY Oldham & Ferguson
ATTORNEYS

VIDEO SIGNAL PROCESSING AMPLIFIER WITH AUTOMATIC GAIN CONTROL

BACKGROUND OF THE INVENTION

This invention relates to automatic gain control circuitry for composite color signals and, in particular, to such circuitry for controlling both the chrominance and luminance levels of such signals and, further maintaining them at a constant level automatically.

Heretofore, test signals have been inserted in various available portions of a television signal in order to measure the levels of the chrominance and luminance components of a composite color television signal. The results of these measurements are generally displayed at a console where they are inspected by an operator, the operator having the discretion of adjusting either the chrominance and/or luminance portion of the signal depending on the displayed indication at the console. However, quite often it is impossible to have an operator present at all times to monitor the displayed indications. Further, in some situations there are so many different parameters to be monitored that it is practically impossible to efficiently and effectively monitor all of the parameters. In such instances, it is desirable that any adjustments or corrections that are necessary be made automatically without any intervention on the part of an operator. Such considerations are particularly applicable to the chrominance and luminance levels of composite color signals where a large number of such signals may be simultaneously originating from numerous sources thereby rendering the monitoring job extremely difficult.

SUMMARY OF THE INVENTION

Thus, it is a primary purpose of this invention to provide circuitry for automatically adjusting and maintaining the chrominance and luminance levels of a composite color signal at a predetermined constant values.

It is a further object of this invention to provide such circuitry for accomplishing the above purpose by utilizing test signals inserted in appropriate, available portions of a conventional composite color television signal.

Other objects and advantages of this invention will become apparent upon reading the appended claims in conjunction with the following detailed description and the attached drawing.

DETAILED DESCRIPTION OF A PREFERRED EMBODIMENT OF AN INVENTION

Figure 1:
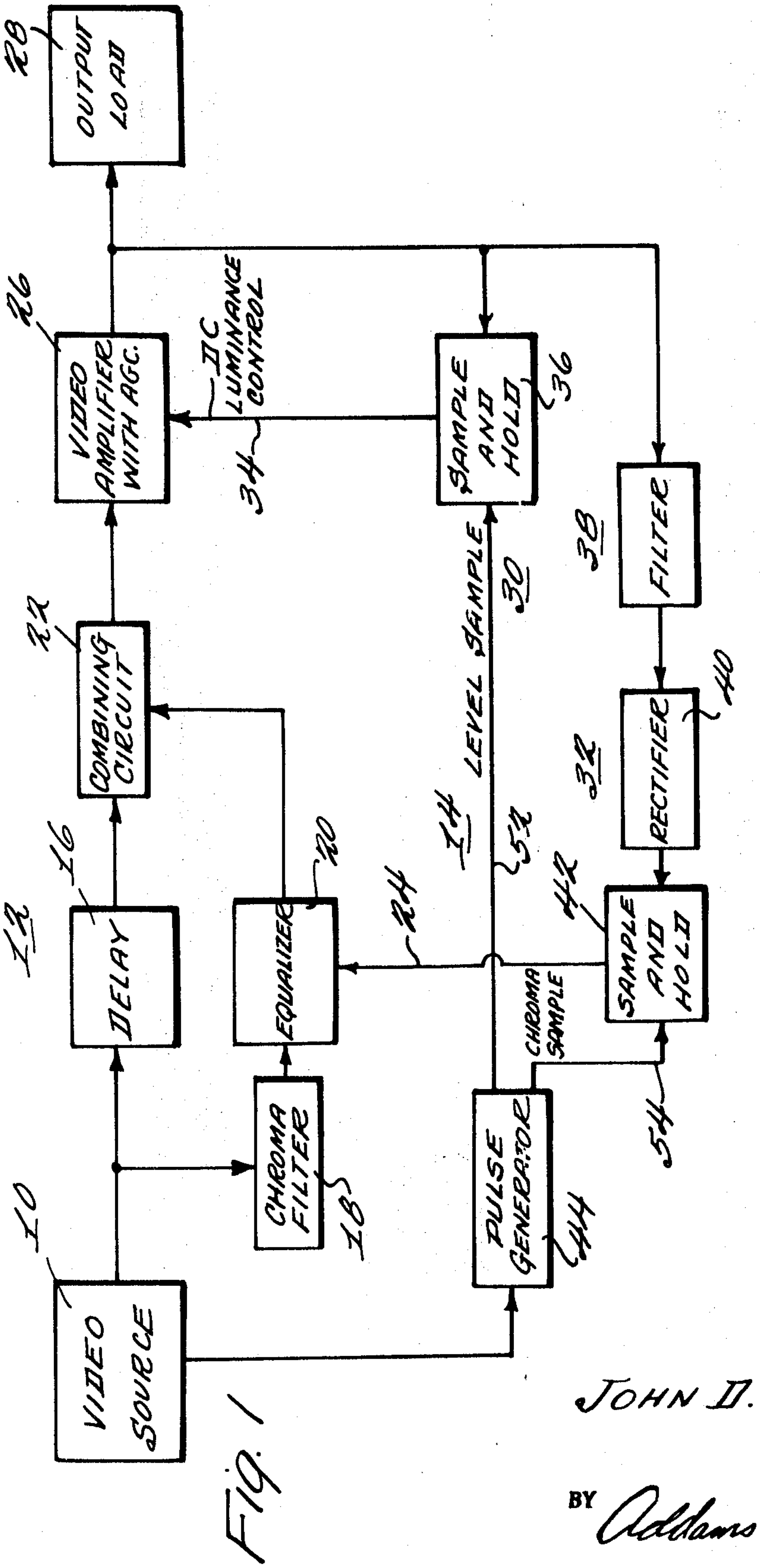
FIG. 1 is a block diagram of an illustrative embodiment of the invention.

Referring to FIG. 1, there is shown a block diagram of the automatic chrominance and luminance level control circuitry of this invention. A composite color television signal is applied from video source 10 to signal channel 12 and automatic gain control loop 14. Channel 12 includes delay means indicated at 16. In parallel with delay 16 is a first signal adjusting means or chroma filter 18 and equalizer 20, the purpose of delay 16 being to delay the composite color signal by an amount sufficient to compensate for any delay introduced by filter 18 and equalizer 20. The output signals from delay 16 and equalizer 20 are combined in combining circuit 22. In brief, chroma filter 18 extracts the higher frequency chrominance component from the composite color signal and applies it to equalizer 20 where the amplitude of these components are adjusted in accordance with a first control signal applied over line 24. The generation of this control signal will be explained in more detail hereinafter. The chroma filter 18 and the equalizer 20 may be any circuitry suitable for performing the functions required by these elements. In particular, the circuitry described in copending U.S. Pat. application Ser. No. 649,548, filed June 28, 1967 by John D. Ross and Ole Syrydstrup now U.S. Pat. No. 3,549,901 granted Dec. 22, 1970 and assigned to the assignee of the instant application discloses circuitry appropriate for performing the functions of blocks 18 and 20 of FIG. 1. Further, the aperture corrector of FIG. 1 of the above-mentioned patent application would appropriately perform the function required of chroma filter 18 of FIG. 1 of the instant invention. Also, the DC control signal applied to the gate of FET 40 of the above-mentioned patent application would appropriately correspond to the first control signal applied over line 24 of FIG. 1 of the instant invention. The output of combining circuit 22 is applied to a second gain adjusting means or AGC video amplifier 26 and thence to an appropriate output circuit 28.

The output from video amplifier 26 is also applied to loop 14 and in particular to subloops 30 and 32. The general purpose of the circuitry of subloop 30 is to sense the level of the luminance component of the output signal from amplifier 26 and depending on the sensed level, generate a second control signal (preferably DC over line 34 to control the gain of amplifier 26. The sensing circuit employed in subloop 30 to perform this function is sample and hold circuit 36.

Figure 2:
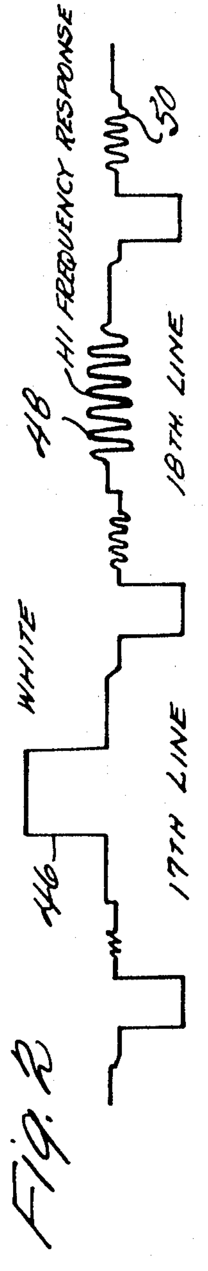
FIG. 2 is an illustrative waveform showing the test signals utilized by the circuitry of FIG. 1 to effect the automatic level control of the luminance and chrominance components of a composite color television signal.

The function of the circuitry of subloop 32 is to sense the level of the chrominance component of the output signal from amplifier 26 and depending on the sensed level, generate the before mentioned first control signal over line 24 for control of equalizer 20. Subloop 32 includes filter 38, rectifier 40, and sample and hold circuit 42. In addition to incorporating subloops 30 and 32, loop 14 includes pulse generator 44. In order to better understand the function and operation of the circuitry of loop 14, reference should be made to FIG. 2, which illustrates predetermined lines of the vertical blanking interval of a conventional television signal. Thus, typically, the lines may be the 17th and 18th lines of this interval as indicated in FIG. 2. Within each of these lines are respectively inserted first and second test signals (by means not shown) which are used to respectively provide an indication of the luminance and chrominance levels of the composite color signal. In particular, in the 17th line, the first test signal is shown as reference pulse 46, the level of which corresponds to white and which may be typically 100 IRE units. Further, the positioning of this pulse during the 17th line interval may typically be during the last ten microseconds of the line.

In the 18th line is shown a high frequency burst, the frequency of which may be that of the color burst—that is, approximately 3.58 MHz. This high frequency reference signal is indicated at 48 and is employed to provide an indication of the deterioration, if any, of the chrominance components of the composite color signal. Rather than employ the high frequency burst indicated at 48, the conventional color burst indicated at 50 may also be employed as a test signal to determine or measure the quality of the chrominance components of the signal. In FIG. 2, the high frequency burst 48 is greatly enlarged for purpose of illustration only, it being understood that the burst 48 and the burst 50 would be approximately of the same frequency if the burst 48 had a frequency corresponding to that of the color burst.

Thus, the first and second test signals 46 and 48 may be respectively inserted in the 17th and 18th lines of the vertical blanking interval of each field to provide a continuous indication of the levels of the luminance and chrominance components of the composite color signal and to thereby enable the automatic level control of both of these components.

Having described the test signals of FIG. 2, the operation of the circuitry of FIG. 1 will now be described. The composite color signal from video source 10 is applied to pulse generator or sample pulse generating means 44 which generates first and second sampling signals respectively over lines 54 and 52, these signals preferably being pulses. The second sampling pulse on line 52 is so timed as to correspond to the approximate center of the test pulse 46 of FIG. 2. Appropriate circuitry for generating this sampling pulse would be well known to those of ordinary skill in this art. Essentially the pulse generator 44 incorporates counting circuitry, the counting cycle of which is initiated by the beginning of the vertical blanking interval and which causes an appropriately timed sampling pulse to occur on line 52 after 17 lines of this interval have been counted. Of course, the effect of the serating and equalizing pulses, which occur during the vertical blanking interval, would be taken into consideration in the design of such counting circuitry.

The first sampling pulse is generated during the approximate center of the high frequency burst occurring during the 18th line, this sampling pulse occurring on line 54 and being generated in exactly the same manner as the pulse on line 52, with the exception, of course, that the pulse on line 54 is generated approximately one horizontal line later in time. The level sampling pulse on line 52 is applied to sample and hold circuit 36 so that the amplitude of the test pulse 46 is sampled and held in an appropriate storage device such as a capacitor to thereby generate a DC signal on line 34, the amplitude of which is a function of the amplitude of the sampled test pulse 46. The control signal on line 34 is thus applied to the AGC circuitry of video amplifier 26 to control the gain thereof in a well known manner. That is, the use of AGC circuits to control the gain of amplifiers is well known and it is contemplated that typical AGC circuitry would utilize the control signal derived on line 34 to control the gain of amplifier 26. It is to be noted that the entire composite color signal has its level regulated at amplifier 26.

However, at equalizer 20 only the level of the chrominance component of the composite color signal is adjusted, this adjustment taking place in a manner now to be described.

As stated hereinbefore, the first sampling pulse is generated on line 54 in approximate time coincidence with the center portion of the high frequency burst test signal 48. Filter 38 extracts the chrominance components together with the test signal 48 from the composite color signal occuring at the output of amplifier 26. The control burst is rectified at rectifier 40 to provide an envelope of the positive peaks of the control burst signal. This rectified envelope is then applied to sample and hold circuit 42 where the center portion thereof is sampled by the chroma sampling pulse occurring on line 54. This sampled level is then held in an appropriate storage device in sample and hold circuit 42 such as a capacitor whereby a DC signal is provided to line 24 to control equalizer 20 in the manner described hereinbefore. As stated above, preferably the center of the positive peaks of the burst is sampled thereby avoiding inaccuracies which may result from poor burst transient response or compression of the lower half of the burst. Thus, only the chrominance portion of the video signal is adjusted prior to the adjustment of the luminance level in video amplifier 26. Thus, it can now be seen that the composite color output signal from amplifier 26 has the luminance and chrominance levels thereof automatically maintained at a constant level. In particular, the chrominance level will be adjusted whenever the first test signal deviates from a predetermined level established therefor and the luminance level will be adjusted whenever the second test signal deviates from a predetermined level (for example, the 100 IRE units mentioned hereinbefore).

Numerous modifications of the invention will become apparent to one of ordinary skill in the art upon reading the foregoing disclosure. During such a reading it will be evident that this invention provides unique level control circuitry for accomplishing the objects and advantages herein stated.

What is claimed is:

1. Circuitry for providing automatic level control of the luminance and chrominance components of a composite color television signal, said circuitry comprising:

means for providing said composite color signal, said signal including a first test signal extending in the white direction and indicative of the amplitude of the luminance component of the composite color signal and a second test signal indicative of the amplitude of the chrominance component of said composite color signal, said first and second test signals being respectively disposed in predetermined lines of the vertical blanking interval of said composite color signal;

first signal adjusting means responsive to a first control signal and the chrominance component of said composite color signal for adjusting the amplitude of said chrominance component whenever the amplitude of said first control signal deviates from a predetermined amplitude established therefor;

second signal adjustment means responsive to a second control signal and the output signal from said first signal adjusting means for adjusting the amplitude of the luminance component of said composite color signal whenever the amplitude of said second control signal deviates from a predetermined amplitude established therefor;

means responsive to the second test signal in the output signal from said second signal adjusting means and said composite color signal for generating said first control signal and applying it to said first signal adjusting means; and means responsive to the first test signal in the output signal from said second signal adjusting means and said composite color signal for generating said second control signal and applying it to said second signal adjusting means;

whereby the luminance and chrominance components are automatically maintained at constant levels.

2. Circuitry as in claim 1 where said second signal adjusting means includes means for adjusting the amplitude of the entire composite color signal.

3. Circuitry as in claim 1 where said second test signal is a high frequency burst signal having a frequency substantially higher than the frequencies of the luminance components of said composite color signal.

4. Circuitry as in claim 3 where said means for generating said first control signal includes means for rectifying the positive peaks of said second test signal;

means responsive to said color composite signal for generating a first sampling pulse occurring in approximate time coincidence with the center of the rectified second test signal; and circuitry responsive to said rectified second test signal and said first sampling pulse to generate said first control signal, the amplitude of which is a function of the amplitude of said rectified second test signal at said center thereof.

5. Circuitry as in claim 1 where said means for generating said first control signal includes sample pulse generating means responsive to said composite color signal for generating a first sampling pulse occurring in approximate time coincidence with said second test signal; and means responsive to said first sampling pulse and said second test signal for sampling the level of said second test signal and generating said first control signal therefrom.

6. Circuitry as in claim 5 where said first test signal is a pulse having a substantially constant amplitude.

7. Circuitry as in claim 6 where the amplitude of said first test signal pulse approximately corresponds to level white.

8. Circuitry as in claim 7 where said amplitude of said first test signal is approximately 100 IRE units.

9. Circuitry as in claim 6 where said sample pulse generating means is responsive to said composite color signal for generating a second sampling pulse occurring in approximate time coincidence with said first test signal; and means responsive to said first test signal and said second sampling pulse for sampling the level of said first test signal to generate said second control signal the amplitude of which is a function of the amplitude of said first test signal.

10. Circuitry as in claim 9 where said first and second test signals respectively occur during the 17th and 18th lines of the vertical blanking interval.

11. Circuitry as in claim 10 where said sample pulse generating means is responsive to the beginning of said vertical blanking interval to generate said second and first sampling pulses during the 17th and 18th lines, respectively.